United States Patent [19]

Valentino

[11] Patent Number: 5,743,153
[45] Date of Patent: Apr. 28, 1998

[54] BICYCLE HANDLEBAR STABILIZER

[76] Inventor: Joseph A. Valentino, 230 Sycamore Mills Rd., Media, Pa. 19063

[21] Appl. No.: 764,725

[22] Filed: Dec. 10, 1996

[51] Int. Cl.$^6$ .............................. B62K 21/12; F16H 53/00
[52] U.S. Cl. ..................... 74/551.8; 74/551.1; 74/551.3; 74/551.7; 74/567
[58] Field of Search .................... 74/551.1–551.8, 74/567; 280/279, 280

[56] References Cited

U.S. PATENT DOCUMENTS

| | | |
|---|---|---|
| 583,291 | 5/1897 | Miller. |
| 602,279 | 4/1898 | Battersby. |
| 610,068 | 8/1898 | Lapaugh. |
| 636,740 | 11/1899 | Amenábar. |
| 5,249,879 | 10/1993 | Zoor. |
| 5,279,137 | 1/1994 | Orbell. |
| 5,337,609 | 8/1994 | Hsu. |
| 5,440,948 | 8/1995 | Cheng. |
| 5,445,047 | 8/1995 | Chi ................................ 74/551.1 |
| 5,474,270 | 12/1995 | Rixen et al.. |
| 5,476,020 | 12/1995 | Garvey et al.. |
| 5,479,836 | 1/1996 | Chang ............................ 74/551.1 |
| 5,492,350 | 2/1996 | Pan ................................. 280/278 |
| 5,517,878 | 5/1996 | Klein et al. .................... 74/551.3 |

FOREIGN PATENT DOCUMENTS

| | | | |
|---|---|---|---|
| 0172979 | 3/1986 | European Pat. Off. ........... 74/551.1 |
| 1064402 | 5/1954 | France ............................ 74/551.1 |

*Primary Examiner*—Vinh T. Luong
*Attorney, Agent, or Firm*—Finnegan, Henderson, Farabow, Garrett & Dunner, L.L.P.

[57] ABSTRACT

A bicycle handlebar stabilizer is attachable to a bicycle, the bicycle including a head tube and a set of handlebars projecting from a stem, with the stem mounted to the head tube at a pivot point to be pivotable with respect to the head tube. The bicycle handlebar stabilizer is comprised of a first clamp attachable to the stem of the bicycle above the pivot point, a bracket pivotally attached to the first clamp, a cam follower attached to a distal end of the bracket, and a second clamp having a surface and a notch in the surface that is attachable to the head tube of the bicycle below the pivot point. The bracket is pivotable between a first position with the cam follower engaged with the notch in the surface of the second clamp, and a second position with the cam follower and the notch disengaged.

18 Claims, 4 Drawing Sheets

BICYCLE HANDLEBAR STABILIZER

BACKGROUND OF THE INVENTION

1. Field of Invention

This invention relates to a bicycle handlebar stabilizer. More particularly, this invention relates to a bicycle handlebar stabilizer that prevents the handlebar and the front wheel of a bicycle from being thrown off center.

2. Description of Related Art

Bicycle riders often prefer to ride their bicycles without using their hands. This method of riding a bicycle is dangerous and can lead to serious injury. For example, if a bicyclist is riding without using his hands and the front wheel of the bicycle contacts a rock or other obstacle, the front wheel may be jarred to the side causing the bicycle to fall.

Another problem occurs when a bicycle is leaned on its kickstand. In this position, the front wheel and handlebars often twist to the side on which the bicycle is leaning, sometimes causing the bicycle to fall.

A device therefore is needed to stabilize the handlebar and front wheel of the bicycle such that when it comes in contact with an object, or when the bicycle is leaning to one side, the handlebar and front wheel are not thrown off center.

Bicycle locks are known that positively lock the handlebars to a cross bar of the bicycle frame. This type of lock is disadvantageous in that once the lock is engaged, locking the handlebars to the cross bar, it cannot be easily disengaged. For example, if the lock is engaged while the bicyclist is riding the bicycle, the bicyclist cannot retake control of the handlebars quickly and easily, thus creating yet another dangerous situation. Another disadvantage of this type of positive lock is that it cannot be used on a bicycle that does not have a cross bar parallel to the ground. Traditionally, some bicycles designed for female bicyclists do not have cross bars parallel to the ground.

Thus, a bicycle handlebar stabilizer is needed that can be engaged and disengaged while the rider is operating the bicycle, and that does not require a cross bar for use.

SUMMARY OF THE INVENTION

Accordingly, the present invention is directed to a bicycle handlebar stabilizer that substantially obviates one or more of the problems due to the limitations and disadvantages of the related art.

Additional advantages of the invention will be set forth in the description which follows, and in part will be apparent from the description or may be learned by practice of the invention. The advantages of the invention may be realized and obtained by means of the combinations particularly pointed out in the appended claims.

To achieve these and other advantages and in accordance with the purpose of the invention, as embodied and broadly described, the invention includes a bicycle comprising a head tube, and a set of handlebars projecting from a stem that is mounted to be pivotable at a pivot point with respect to the head tube. The invention further includes a bicycle handlebar stabilizer comprising a first clamp attached to the stem above the pivot point, a bracket pivotally attached to the first clamp, a cam follower attached to a distal end of the bracket, and a second clamp having a surface and a notch in the surface that is attached to the head tube below the pivot point. The bracket is pivotable between a first position with the cam follower engaged with the notch in the surface of the second clamp, and a second position with the cam follower and the notch disengaged.

In another aspect, the invention includes a bicycle handlebar stabilizer attachable to a bicycle, wherein the bicycle includes a head tube and a set of handlebars projecting from a stem, with the stem mounted to the head tube at a pivot point to be pivotable with respect to the head tube. The bicycle handlebar stabilizer is comprised of a first clamp attachable to the stem of the bicycle above the pivot point, a bracket pivotally attached to the first clamp, a cam follower attached to a distal end of the bracket, and a second clamp having a surface and a notch in the surface that is attachable to the head tube of the bicycle below the pivot point. The bracket is pivotable between a first position with the cam follower engaged with the notch in the surface of the second clamp, and a second position with the cam follower and the notch disengaged.

It is to be understood that both the foregoing general description and the following detailed description are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate several embodiments of the invention and together with the description serve to explain the principles of the invention. In the drawings.

DETAILED DESCRIPTION OF THE PREFERRED EMBODIMENTS

Reference will now be made in detail to the present preferred embodiments of the invention, examples of which are illustrated in the accompanying drawings.

Figure 1:
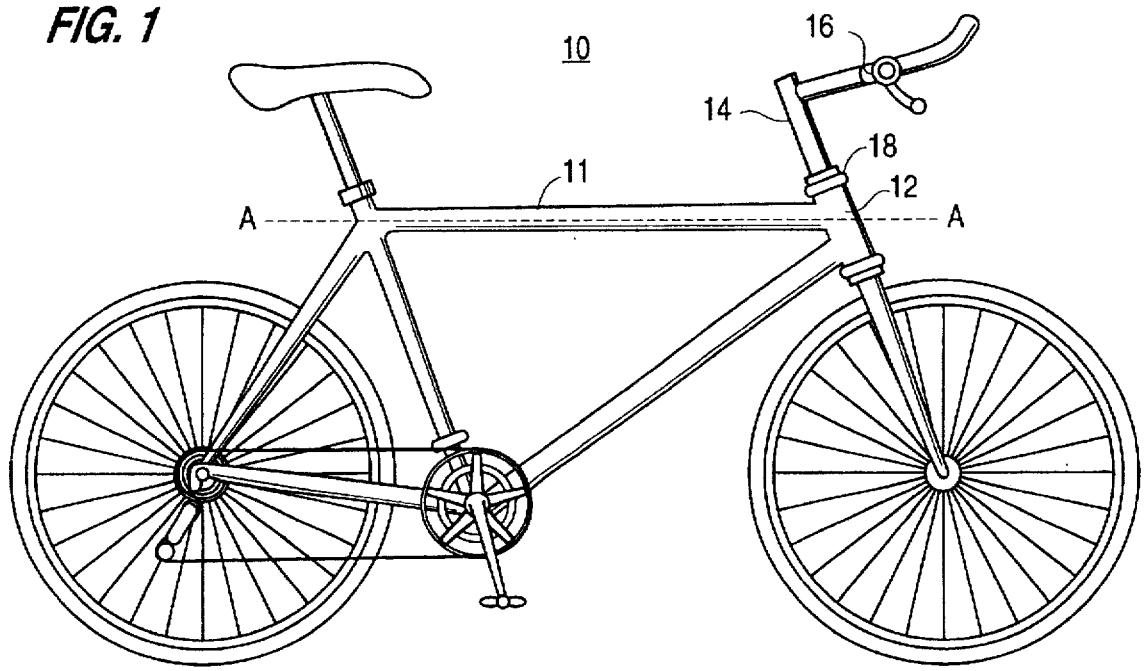
FIG. 1 is a side view of a bicycle with a bicycle handlebar stabilizer attached.

The invention includes a bicycle. As shown in FIG. 1, a bicycle 10 broadly includes a frame 11, including at least a head tube 12, a stem 14, handlebars 16, and a pivot point 18. The handlebars 16 project from the stem 14, and the stem 14 is mounted to be pivotable at a pivot point 16 with respect to the head tube 12.

In accordance with the invention, a handlebar stabilizer is provided, attachable to the bicycle. As broadly embodied herein, a bicycle handlebar stabilizer 20 is described in detail below.

The bicycle handlebar stabilizer of the invention includes a first clamp attachable to the bicycle stem above the pivot point. As broadly shown in FIG. 2, a first clamp 22 attaches to the stem 14 of the bicycle 10 proximate to, but slightly above, the pivot point 18.

Figure 6:
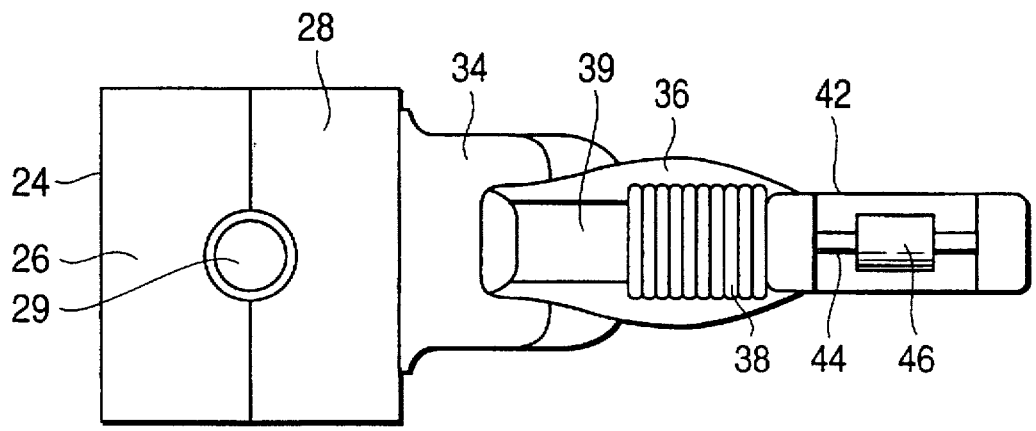
FIG. 6 is a bottom view of the first clamp portion shown in FIG. 5.

Preferably, the first clamp includes a mounting block defining a countersunk aperture in a center position. Referring to FIG. 6, the first clamp 22 includes a mounting block 24, having a first portion 26 and a second portion 28, detachably joinable together, defining an aperture 29 therebetween. As shown in FIG. 6, the aperture 29 has been countersunk, at least at a lower surface thereof, for ease of attachment to the stem 14 above the pivot point 18.

Figure 2:
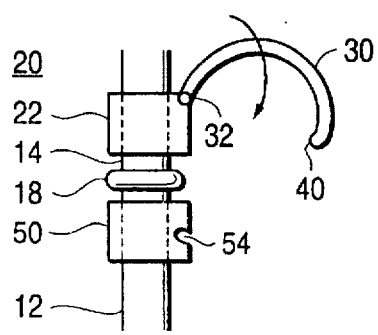
FIG. 2 is a side view of a preferred embodiment of a bicycle handlebar stabilizer in accordance with the invention, in a disengaged position.

In accordance with the invention, a bracket is pivotally attached to the first clamp. Referring to FIG. 2, a bracket 30 is attached to one surface of the first clamp 22. As broadly shown in FIG. 2, the bracket 30 can be pivotally attached directly to the first clamp 22 at a pivot point 32. However, referring to FIGS. 4 and 5, it is preferred that the bracket 30 include a mounting portion 34, fastened directly to the first clamp 22, and a pivoting portion 36, pivotally connected together at the pivot point 32.

It is further preferred that the bracket 30 be spring-loaded. Referring to FIG. 6, a spring 38 is provided along a stem 39, mounted on a lower side of the pivoting portion 36. The function of the spring 38 will be described below.

The invention further comprises a cam follower attached to a distal end of the bracket. As broadly shown in FIG. 2, a cam follower 40 is provided at a distal free end of the bracket 30, opposite the pivot point 32. In accordance with the invention, and as broadly described in FIG. 2, the cam follower 40 includes an arcuate surface.

Figure 4:
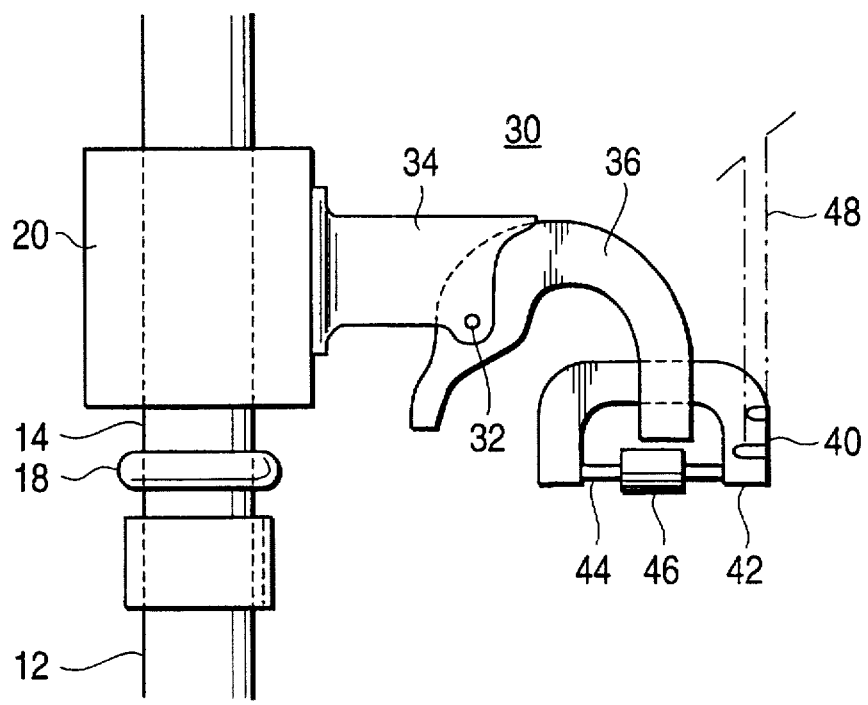
FIG. 4 is a side view of another preferred embodiment of a bicycle handlebar stabilizer attached to a bicycle.
Figure 5:
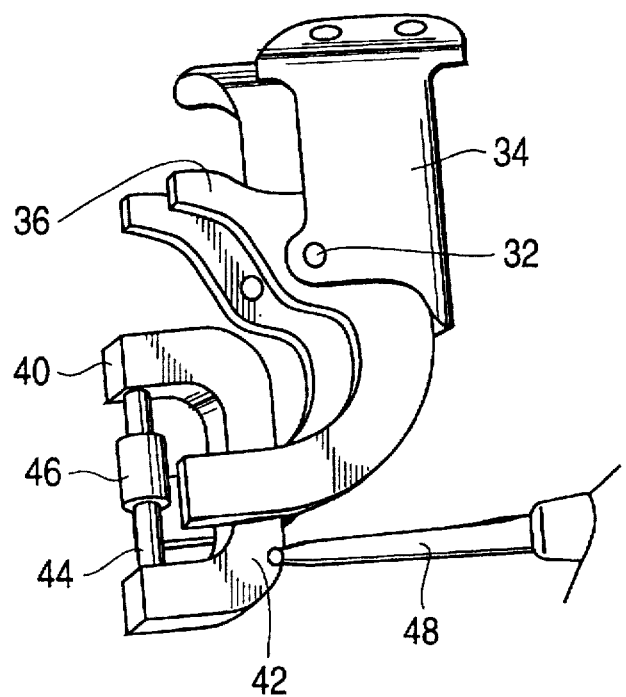
FIG. 5 is a perspective view of a first clamp portion of the bicycle handlebar stabilizer shown in FIG. 4.

Referring to FIGS. 4, 5, and 6, the cam follower 40 preferably comprises a generally U-shaped bracket 42, mounted to the pivoting portion 36 of the bracket 30. The U-shaped bracket 42 is bridged by a stem 44, with a cylindrical roller 46 rotatably mounted on the stem 44.

It is further preferred that the U-shaped bracket include a handle. Referring to FIGS. 4 and 5, an elongated handle 48 is attached to the U-shaped bracket 42 and projects therefrom. The function of the handle is discussed below.

In accordance with the invention a second clamp is attachable to the head tube below the pivot point, the second clamp having a surface and a notch disposed in the surface defining a cam. As broadly shown in FIG. 2, a second clamp 50 attaches to the head tube 12 of the bicycle 10, proximate to, but slightly below, the pivot point 18.

Figure 7:
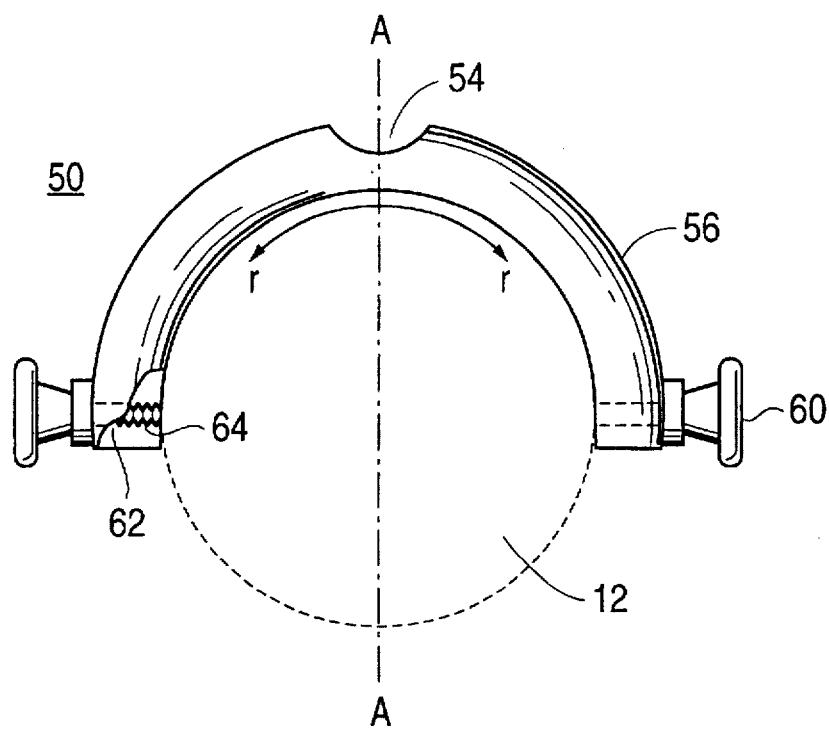
FIG. 7 is a top view of the second clamp portion of the bicycle handlebar stabilizer shown in FIG. 4.

Preferably, the second clamp includes a notch in the surface, defining a cam, having an arc angle of less than 180°. Referring to FIG. 7, the second clamp 50 preferably comprises a generally semi-circular shaped clamp 56, having on the outer surface a notch 54 with an arc angle of less than 180°.

It is further preferred that the second clamp include a means for attaching the second clamp to the head tube. As shown in FIG. 7, the second clamp 50 preferably includes a pair of screws 60 inserted through apertures 62 and held in place by a series of screw threads 64. Other well-known fasteners could also be used.

The screws 60 enable attachment of the second clamp 50 in a variety of positions, as desired by the bicycle operator. As shown in FIG. 1, bicycle frame 11 defines an axis A—A passing through head tube 12. Referring to FIG. 7, second clamp 50 can be attached to head tube 12 with a cam 54 positioned in line with axis A—A. Alternatively, second clamp 50 can be rotated along arc r—r and attached with cam 54 positioned to the right or left of axis A—A.

This capability of adjusting the position of cam 54 with respect to the axis A—A of the bicycle is significant for the following reasons. First, if the bicycle rider rides no-hands, and leans to the right or left, the cam 54 can be positioned on the opposite side of the axis A—A as the rider's lean in order to keep the bicycle stabilized. In other words, if the rider leans to the right, screws 60 can be loosened and retightened in order to attach second clamp 50 on head tube 12 with cam 54 to the left of axis A—A, thereby stabilizing the bicycle. Second, if the bicycle is leaned on its kickstand and a load is attached (e.g., a full basket) which would tend to throw the bicycle off-center, the second clamp position can again be adjusted as described above to correct for this off-centering load.

Figure 3:
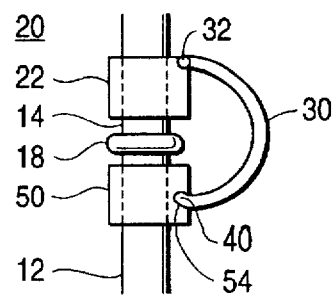
FIG. 3 is a side view of the bicycle handlebar stabilizer of FIG. 2, shown in the engaged position.

In accordance with the invention, the bracket is pivotable between a first position, where the cam follower is engaged with a notch in the surface of the second clamp, and a second position, where the cam follower and the notch are disengaged. As broadly shown in FIG. 3, when in the first position, the bracket 30 pivots downward past the pivot point 18 of the bicycle 10, allowing the cam follower 40 to rest in the cam 54, inhibiting the movement of the handlebars 16. As broadly shown in FIG. 2, when in the second position, the bracket 30 remains in the upward position and the cam follower 40 does not come into contact with the cam 54, thus allowing unrestricted movement of the handlebars 16.

As previously mentioned, it is preferred that the first bracket include a handle. Referring to FIGS. 4 and 5, the elongated handle 48 is attached to the U-shaped bracket 42 and projects therefrom. The elongated handle 48 is provided to assist in moving the pivoting portion 36 between the disengaged second position and the engaged first position.

As previously mentioned, it is preferred that the bracket 30 be spring-loaded. Referring to FIG. 6, the spring 38 is provided along the stem 39, mounted on a lower side of the pivoting portion 36. The spring 38 provides a force on the pivoting portion 36 which in turn helps hold the cylindrical roller 46 in the cam 54. The holding force is sufficient to restrict movement of the handlebars 16 if the bicycle 10 comes in contact with a rock or other small object while the bicycle rider is not holding onto the handlebars 16.

Figure 8:
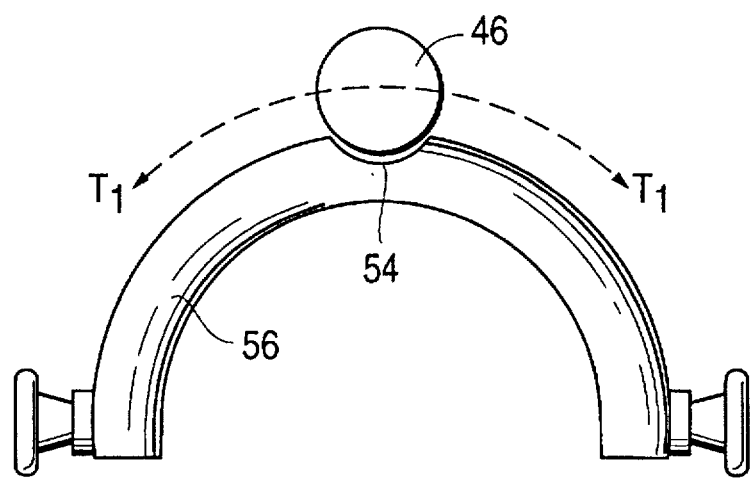
FIG. 8 is a bottom view of the second clamp shown in FIG. 7 with a cam follower resting in the cam.
Figure 9:
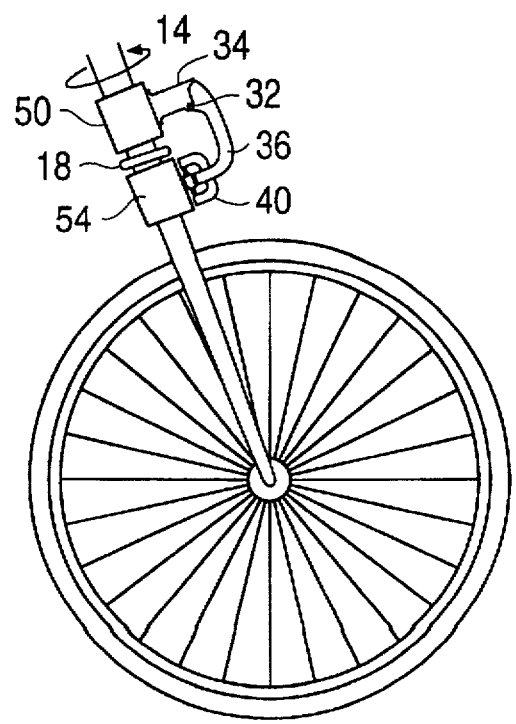
FIG. 9 is a front view of a bicycle handlebar stabilizer attached to a bicycle with the stabilizer in another disengaged position.

However, the holding force can be overcome, and the bicycle handlebar stabilizer disengaged, by the bicycle rider applying a selected amount of torque to the handlebars 16. When such torque is applied, the cylindrical roller 46 will slide out of the cam 54 and allow free movement of the handlebars 16. This is possible because the arc angle of the notch 54 is less than 180°. FIG. 8 depicts the arcuate cylindrical roller 46 in the notch 54. The arc angle of the notch 54, being less than 180°, permits the cylindrical roller 46 to rotate out of engagement with the notch 54 upon application of a preselected torque T, in either direction. The exact amount of torque needed to disengage the cylindrical roller and the cam 54 depends upon the radius of the cylindrical roller 46 and the arc angle of the notch 54. FIG. 9 shows the bicycle handlebar stabilizer disengaged, with the cylindrical roller 46 resting on the second clamp 50, following application of torque to the handlebars 16 by the bicycle rider. From the figure, it can be seen that even when the handlebar stabilizer is engaged, the bicycle rider can still take control of the handlebars if necessary.

It will be apparent to those skilled in the art that various modifications and variations can be made in the bicycle handlebar stabilizer of the present invention without departing from the spirit or scope of the invention. Thus it is intended that the present invention cover such modifications and variations of this invention provided they come within the scope of the appended claims and their equivalents.

I claim:

1. A bicycle, comprising:

a frame including a head tube;

a set of handlebars projecting from a stem, said stem being mounted to be pivotable at a pivot point with respect to said head tube; and a bicycle handlebar stabilizer, said stabilizer comprising:

a first clamp attached to the stem above the pivot point;

a bracket pivotally attached to said first clamp, a cam follower being defined on a distal end of said bracket; and a second clamp attached to the head tube below the pivot point, said second clamp having a surface and a notch disposed in said surface, said notch defining a cam;

wherein said bracket is pivotable between a first position with said cam follower engaging said cam, and a second position with said cam follower disengaged from said cam.

2. The bicycle of claim 1, wherein said cam follower has an arcuate surface.

3. The bicycle of claim 1, wherein said notch in said cam has an arc angle of less than 180°.

4. The bicycle of claim 1, wherein said first clamp includes a mounting block defining a countersunk aperture in a center portion.

5. The bicycle of claim 1, wherein said bracket is spring loaded so that it applies a holding force on the cam follower bracket when in the first position.

6. The bicycle of claim 1, wherein said bracket includes a handle.

7. The bicycle of claim 1, wherein said cam follower includes a cylindrical roller.

8. The bicycle of claim 1, wherein said second clamp includes attaching means for attaching said second clamp to the head tube.

9. The bicycle of claim 1, wherein the bicycle frame defines an axis and said attaching means permit attachment of said second clamp to the head tube with said cam positioned offset from the axis.

10. A bicycle handlebar stabilizer attachable to a bicycle, the bicycle including a head tube and a set of handlebars projecting from a stem, the stem mounted to the head tube at a pivot point to be pivotable with respect to the head tube, the stabilizer comprising:

a first clamp attachable to the stem above the pivot point;

a bracket pivotally attached to said first clamp, a cam follower being defined on a distal end of said bracket; and a second clamp attachable to the head tube below the pivot point, said second clamp having a surface and a notch disposed in said surface, said notch defining a cam;

wherein said bracket is pivotable between a first position with said cam follower engaging said cam, and a second position with said cam follower disengaged from said cam.

11. The bicycle handlebar stabilizer of claim 10, wherein said cam follower has an arcuate surface.

12. The bicycle handlebar stabilizer of claim 10, wherein said notch in said cam has an arc angle of less than 180°.

13. The bicycle handlebar stabilizer of claim 10, wherein said first clamp includes a mounting block defining a countersunk aperture in a center portion.

14. The bicycle handlebar stabilizer of claim 10, wherein said bracket is spring loaded so that it applies a holding force on the cam follower in the first position.

15. The bicycle handlebar stabilizer of claim 10, wherein said bracket includes a handle.

16. The bicycle handlebar stabilizer of claim 10, wherein said cam follower includes a cylindrical roller.

17. The bicycle handlebar stabilizer of claim 10, wherein said second clamp includes means for attaching said second clamp to the head tube.

18. The bicycle handlebar stabilizer of claim 10, wherein said second clamp is attachable to the head tube such that said cam is offset from an axis defined by the bicycle passing through the head tube.

* * * * *